United States Patent
Ahn et al.

(10) Patent No.: US 7,616,668 B2
(45) Date of Patent: Nov. 10, 2009

(54) FIBER LASER SYSTEM USING FIBER HAVING DYSPROSIUM

(75) Inventors: Joon Tae Ahn, Daejeon (KR); Hong-Seok Seo, Daejeon (KR); Bong Je Park, Daejeon (KR)

(73) Assignee: Electronics and Telecommunications Research Institute, Daejeong (KR)

( * ) Notice: Subject to any disclaimer, the term of this patent is extended or adjusted under 35 U.S.C. 154(b) by 90 days.

(21) Appl. No.: 12/027,417

(22) Filed: Feb. 7, 2008

(65) Prior Publication Data

US 2008/0219298 A1 Sep. 11, 2008

(30) Foreign Application Priority Data

Mar. 6, 2007 (KR) ............... 10-2007-0021970

(51) Int. Cl.
*H01S 3/30* (2006.01)
*H01S 3/14* (2006.01)
*H01S 3/09* (2006.01)
(52) U.S. Cl. .................. 372/6; 372/39; 372/69
(58) Field of Classification Search .......... 372/6, 372/39, 69
See application file for complete search history.

(56) References Cited

OTHER PUBLICATIONS

Yuen H. Tsang et al. "Efficient 2.96 um dysprosium-doped fluoride fibre laser pumped with a Nd:YAG laser operating at 1.3 um", Optics Express, Jan. 23, 2006, vol. 14, No. 2, pp. 678-685.
Stuart D. Jackson, "Continuous wave 2.9 um dysprosium-doped fluoride fiber laser" Applied Physics Letters, vol. 83, No. 7, Aug. 18, 2003, pp. 1316-1318.

*Primary Examiner*—Armando Rodriguez
(74) *Attorney, Agent, or Firm*—Jae Y. Park; Kile Goekjian Reed & McManus

(57) ABSTRACT

Provided is a fiber laser system including fiber containing dysprosium. The fiber laser system uses 1.7-μm pump light. A resonator of the fiber laser system includes a dichroic mirror, a partial reflection mirror, and/or an FBG. Therefore, the fiber laser system can provide 3-μm laser light and have high light pumping efficiency and high output power. The fiber laser system includes: fiber including dysprosium, a pump light source disposed at a side of the fiber and emitting pump light having a wavelength exciting electrons of the dysprosium from a ground energy level $^6H_{15/2}$ to an energy level $^6H_{11/2}$; a first reflection member, disposed between the fiber and the pump light source, transmitting the pump light, and reflecting first lasing light having a first wavelength; and a second reflection member, disposed at a side opposite to the pump light source with respect to the fiber, transmitting a portion of the first lasing light.

22 Claims, 3 Drawing Sheets

FIBER LASER SYSTEM USING FIBER HAVING DYSPROSIUM

CROSS-REFERENCE TO RELATED PATENT APPLICATION

This application claims the benefit of Korean Patent Application No. 10-2007-0021970, filed on Mar. 6, 2007, in the Korean Intellectual Property Office, the disclosure of which is incorporated herein in its entirety by reference.

BACKGROUND OF THE INVENTION

1. Field of the Invention

The present invention relates to a fiber laser, and more particularly, to a fiber laser system including a non-oxide fiber as a gain medium and fiber having dysprosium for 3-μm lasing.

2. Description of the Related Art

In a fiber laser, pump light and laser light propagate through a fiber. Therefore, pump light (i.e., light generated by a pump light source) can be efficiently converted, and a resonator can be simply constructed since it is not necessary to align optical components. Furthermore, since the alignment of the resonator is not readily distorted, the output light of the fiber laser is stable, and the mode characteristics of the output light of the fiber laser are good. In addition, since the output end of fiber can be freely moved, the fiber laser can be conveniently used. Examples of the fiber laser include an ytterbium (Yb) fiber laser emitting light having a wavelength of about 1 μm, an erbium (Er) fiber laser emitting light having a wavelength of about 1.5 μm, and a thulium (Tm) fiber laser emitting light having a wavelength of about 2 μm. Such fiber lasers have high output power or are wavelength tunable. Thus, the fiber lasers are widely commercialized and used in, for example, industrial, medical, military, and scientific fields. Silica-based fiber is mainly used for the fiber lasers owing to its low light loss and heat-resisting characteristics. Furthermore, the silica-base fiber is suitable for high output power fiber lasers since the technology for manufacturing optical devices of a silica-based fiber laser is well-developed and silica-based fiber cables can be easily connected by fusion splicer.

However, silica-based fiber lasers have increased light loss when emitting light having a wavelength of about 2 μm or higher and are difficult to operate in a mid-infrared wavelength band since the possibility of non-radiative transition is high due to large phonon energy.

The mid-infrared wavelength band ranges from about 2 μm to about 20 μm and is considered suitable for medical, military, and environmental applications. Particularly, absorption of water molecules is maximal at a wavelength of about 3 μm. Therefore, a biological body having a high water ratio can be easily cut using laser light having a wavelength of about 3 μm even when lasing power is low. A laser capable of generating light of about 3 μm can be usefully used for medical instruments such as a laser scalpel. Currently, lasers such as 2.7-μm Er:YSGG lasers and 2.9-μm Er:YAG lasers are commercialized and have limited applications in medical fields. Due to the limitations of bulk solid-state lasers, research has been ceaselessly conducted on fiber lasers capable of lasing at about 3-μm. For example, laboratory-level research articles have been published on Er (erbium):ZBLAN (Zirconium Barium Lanthanum Aluminum Sodium Fluoride) or Ho (holmium):ZBLAN fiber lasers that are made by doping fluoride-based ZBLAN fiber with a rare-earth element such as erbium (Er) or holmium (Ho). However, such fiber lasers generate laser light having a wavelength in the range from about 2.7 μm to about 2.9 μm, which does not correspond to the wavelength of about 3 μm where absorption of water molecules is maximal.

Since dysprosium has an energy level suitable for lasing at a wavelength of about 3 μm for maximal absorption of water molecules, the dysprosium is considered one of the most applicable rare-earth materials for medical fiber lasers. Accordingly, some articles have disclosed Dy:ZBLAN lasers that are formed using ZBLAN fiber doped with dysprosium and are capable of emitting laser light having a center lasing wavelength of about 3 μm by light pumping. In the article "Applied Physics Letters, pp. 1316-1318 (2003)" by a research team of Sydney University, Australia, a fiber laser capable of lasing at 3 μm is realized by absorption of 1.1 μm pump light to $^6H_{7/2}$ and $^6F_{9/2}$ energy levels. However, the slope efficiency of the disclosed fiber laser is low at about 4.5% since electrons at excited energy level absorb the pump light (excited state absorption, ESA). Furthermore, the maximum output power of the disclosed fiber laser is low at about 0.3 W. In another article "Optics Express, pp. 678-685 (2006)" by a research team of Manchester University, England, a fiber laser capable of lasing at 3 μm is realized by absorption of 1.3 μm pump light to $^6H_{9/2}$ and $^6F_{11/2}$ energy levels. The latter fiber laser shows less ESA compared with the former fiber laser using 1.1 μm pump light, and thus the slope efficiency of the latter fiber laser is relatively high at about 45%. However, the maximum output power of the latter fiber laser is still low at about 0.2 W. Therefore, there is a need for a high-efficiency, high-power fiber laser including fiber doped with dysprosium for 3 μm lasing.

SUMMARY OF THE INVENTION

The present invention provides a fiber laser system using non-oxide fiber having dysprosium as a gain medium for mid-infrared lasing, the fiber laser system thus having efficient light pumping, and high output power.

According to an aspect of the present invention, there is provided a fiber laser system including: fiber including dysprosium (Dy); a pump light source disposed at a side of the fiber and emitting pump light having a wavelength exciting electrons of the dysprosium (Dy) from a ground energy level $^6H_{15/2}$ to an energy level $^6H_{11/2}$; a first reflection member, disposed between the fiber and the pump light source, transmitting the pump light, and reflecting first lasing light having a first wavelength; and a second reflection member, disposed at a side opposite to the pump light source with respect to the fiber, and transmitting a portion of the first lasing light. The first wavelength may range from 2.7 μm to 3.2 μm and preferably 3 μm.

The first reflection member may be a dichroic mirror or a first fiber Bragg grating (FBG). The second reflection member may be a partial reflection mirror or a second FBG.

In some embodiments of the present invention, the first wavelength may vary according to the change of a center wavelength of the second FBG.

In some embodiments of the present invention, the first reflection member may be a first FBG, and the second reflection member may be a second FBG. The first FBG may have a reflection wavelength band wider than that of the second FBG. The first wavelength may vary according to the change of a center wavelength of the second FBG.

The pump light source may emit laser light having a wavelength in a range from 1.5 μm to 1.9 μm. The fiber may include host glass formed of fluoride-based glass, sulfide-based glass, or selenide-based glass.

According to another aspect of the present invention, there is provided a fiber laser system including: fiber including dysprosium (Dy); a pump light source disposed at a side of the fiber and emitting pump light having a wavelength exciting electrons of the dysprosium (Dy) from a ground energy level $^6H_{15/2}$ to an energy level $^6H_{11/2}$; a first reflection member, disposed between the fiber and the pump light source, transmitting the pump light and reflecting first lasing light having a first wavelength; a second reflection member, disposed at a side opposite to the pump light source with respect to the fiber, and transmitting a portion of the first lasing light; a third reflection member, disposed between the fiber and the pump light source, and emission of second lasing light having a second wavelength; and a fourth reflection member, disposed at the side opposite to the pump light source with respect to the fiber, and the emission of the second lasing light. The first wavelength may range from 2.7 μm to 3.2 μm, and preferably 3 μm. The second wavelength may range from 4.1 μm to 4.5 μm, and preferably 4.3 μm.

In some embodiments of the present invention, the first through fourth reflection members may be first through fourth FBGs, respectively. The first FBG may have a reflection wavelength band wider than that of the second FBG. The first wavelength may vary according to the change of a center wavelength of the second FBG.

In some embodiments of the present invention, the first and third reflection members may be dichroic mirrors, and the second and fourth reflection members may be second and fourth FBGs. The first wavelength may vary according to the change of a center wavelength of the second FBG.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
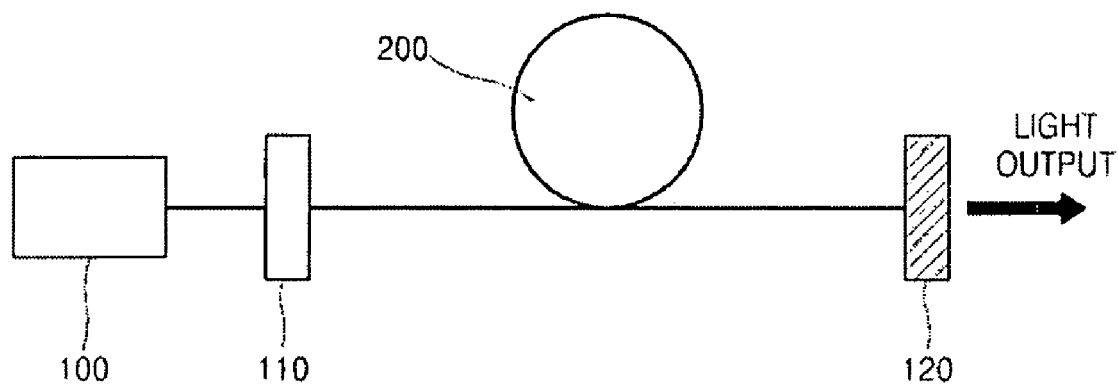
FIG. 1 illustrates a fiber laser system according to an embodiment of the present invention.

The present invention will now be described more fully with reference to the accompanying drawings, in which exemplary embodiments of the invention are shown.

The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity, and like reference numerals denote like elements.

The expressions "first, second . . . " used to explain various members, components, areas, layers and/or parts in the present specification should not be construed as being limited to the members, components, areas, layer, and/or parts. These expressions are used only to differentiate a member, component, area, layer or part from another member, component, area, layer or part. Accordingly, a first member, component, area, layer or part, which will be described later, may refer to a second member, component, area, layer or part, without departing from the teaching of the present invention.

Embodiments of the present invention provide fiber laser systems emitting light having a mid-infrared wavelength band (particularly, 3 μm). According to the embodiments of the present invention, fiber having dysprosium is used for increasing light pumping efficiency and realizing high-power lasing.

Excited state absorption (ESA) is one of dominant factors that affect the pumping efficiency of a fiber laser system. Energy levels of dysprosium are densely distributed as shown in an energy band diagram of FIG. 2. Therefore, electrons excited to an upper energy level by pump light can be further excited to a higher energy level by the pump light. That is, the possibility of ESA is high. The possibility of ESA varies according to the wavelength of pump light. Examples of wavelengths of the pump light that can be used for 3-μm lasing include 1.1 μm, 1.3 μm, 1.7 μm, and 2.8 μm. In published research articles, light having a wavelength of 1.1 μm or 1.3 μm is used as pump light. Pumping efficiency increases when the possibility of ESA decreases. Meanwhile, although ESA occurs, the pumping efficiency can increase when an energy level to which electrons are excited by ESA is not high. For these reasons, the present invention provides a fiber laser system that uses laser light having a wavelength of about 1.7 μm as pump light.

Figure 2:
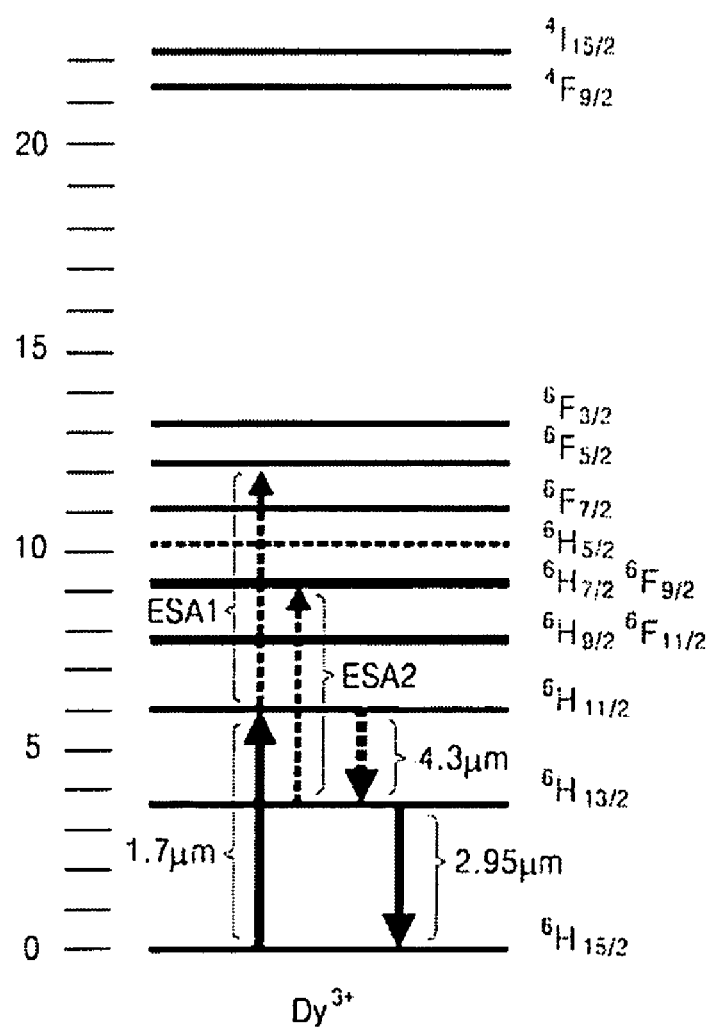
FIG. 2 illustrates an energy band diagram of dysprosium.

FIG. 1 illustrates a fiber laser system according to an embodiment of the present invention and FIG. 2 illustrates an energy band diagram of dysprosium (Dy).

Referring to FIG. 1, fiber including dysprosium is used as a gain medium 200. A pump light source 100 is disposed at a side of the gain medium 200. The pump light source 100 generates laser light having a wavelength of 1.7-μm as pump light. A resonator is disposed at both sides of the gain medium 200 for 3-μm lasing. The resonator includes a dichroic mirror 110 and a partial reflection mirror 120. The dichroic mirror 110 is disposed at a side (light input side) of the gain medium 200 adjacent to the pump light source 100 and receives pump light coming from the pump light source 100. The partial reflection mirror 120 is disposed at the other side (light output side) of the gain medium 200, and transmits light output from the gain medium 200. The dichroic mirror 110 transmits pump light emitted from the pump light source 100. That is, the dichroic mirror 110 transmits light having a wavelength of 1.7 μm. However, the dichroic mirror 110 reflects light having a lasing wavelength (lasing light). That is, the dichroic mirror 110 reflects lasing light emitted from the dysprosium of the gain medium 200. On the other hand, the partial reflection mirror 120 transmits some of the lasing light and reflects the rest.

The pump light source 100 can emit laser light having a wavelength in the range from about 1.5 μm to about 1.9 μm. In the following description, the pump light source 100 emitting laser light having a wavelength of 1.7 μm will be described as an example. The gain medium 200 including dysprosium can emit laser light having a wavelength in the range from about 2.7 μm to about 3.2 μm. In the following description, the gain medium 200 emitting laser light having a wavelength of 3.0 μm will be described as an example. In addition, additional lasing light (second lasing light), to be explained later, can have a wavelength in the range from about 4.1 μm to about 4.5 μm. In the following description, it is assumed that the second lasing light has a wavelength of 4.3 μm.

Referring to FIG. 2, about 1.7 μm pump light can excite electrons of dysprosium from the ground energy level $^6H_{15/2}$ to the energy level $^6H_{11/2}$. Electrons that stay at the energy level $^6H_{11/2}$ due to the above described transition or other reasons can transit to the energy level $^6H_{13/2}$. At this time, light having a wavelength of about 4.3 μm is emitted from the electrons. Thereafter, when the electrons transit from the energy level $^6H_{13/2}$ to the ground energy level $^6H_{15/2}$, light having a wavelength of about 3 μm (or 2.95 μm) is emitted from the electrons.

Meanwhile, the above-described excited state absorption (ESA) can occur. As indicated by ESA1 in FIG. 2, electrons can transit from an energy level $^6H_{11/2}$ to an energy level $^6F_{5/2}$. This transition occurs since electrons further absorb pump light immediately after the electrons are excited from the ground energy level $^6H_{15/2}$ to the energy level $^6H_{11/2}$. In addition, as indicated by ESA2 in FIG. 2, electrons can transit from the energy level $^6H_{13/2}$ to the energy levels $^5H_{7/2}$, $^6F_{9/2}$. This transition occurs since electrons that stay in the energy level $^6H_{13/2}$ due to the above described transition from the ground energy level $^6H_{15/2}$ and other reasons are excited to the energy levels $^6H_{7/2}$, $^6F_{9/2}$ by absorbing pump light again.

In FIG. 2, the tips of the dash-line arrows representing ESA1 and ESA2 do not exactly correspond to the upper energy levels $^6F_{5/2}$ or $^6H_{7/2}$, $^6F_{9/2}$. In other words, ESA1 and ESA2 do not correspond to the centerlines of absorption bands. In this case, although absorption occurs, the loss of pump light by ESA1 and ESA2 is very low as compared with the case where ESA1 and ESA2 exactly correspond to the centerlines of the absorption bands.

Furthermore, electrons can emit light having a wavelength of about 4.3 μm to transit from the energy level $^6H_{11/2}$ where ESA can occur to the energy level $^6H_{13/2}$ for efficient lasing at a desired wavelength (e.g., 3 μm). In this case, electrons stay in the energy level $^6H_{11/2}$ for less time, and the possibility of 3 μm lasing increases. Therefore, lasing efficiency of dysprosium can increase by enabling electrons to easily transit from the energy level $^6H_{11/2}$ to the energy level $^6H_{13/2}$ after the electrons are excited from the ground energy level $^6H_{15/2}$ to the energy level $^6H_{11/2}$ by 1.7 μm pump light.

For this reason, in a modification version of the fiber laser system illustrated in FIG. 1 the dichroic mirror 110 and the partial reflection mirror 120 can have high reflectivity with respect to light having a wavelength of about 4.3 μm. In this case, 4.3-μm lasing is possible by the transition of electrons from the energy level $^6H_{11/2}$ to the energy level $^6H_{13/2}$. Since electrons excited to the energy level $^6H_{11/2}$ from the ground level $^6H_{15/2}$ stay at the energy level $^6H_{11/2}$ for less time owing to the 4.3-μm lasing, the possibility of ESA1 can decrease. Therefore, owing to the configuration for 4.3-μm lasing, the modification version can decrease ESA and increase light pumping efficiency.

The fiber laser system of the present invention uses pump light having a wavelength longer than that used in a conventional fiber laser system. Since quantum efficiency can increase as the wavelength of pump light approaches the wavelength of lasing light, the pumping efficiency of the fiber laser of the present invention can increase. Furthermore, in the fiber laser system of the present invention, the uppermost energy level by ESA is $^6F_{5/2}$ that is relatively low as compared with $^4I_{15/2}$ in the case of a fiber laser system using 1.1 μm pump light or $^6F_{3/2}$ in the case of a fiber laser system using 1.3 μm pump light. Therefore, light loss related to an UV absorption edge of host glass of fiber can be reduced.

Moreover, in the fiber laser system of the current embodiment, fluoride-based glass that is used for a conventional fiber laser system using fiber doped with dysprosium can be used as host glass of fiber, or sulfide-based glass or selenide-based glass allowing a longer UV absorption edge can be used as the host glass.

Figure 3:
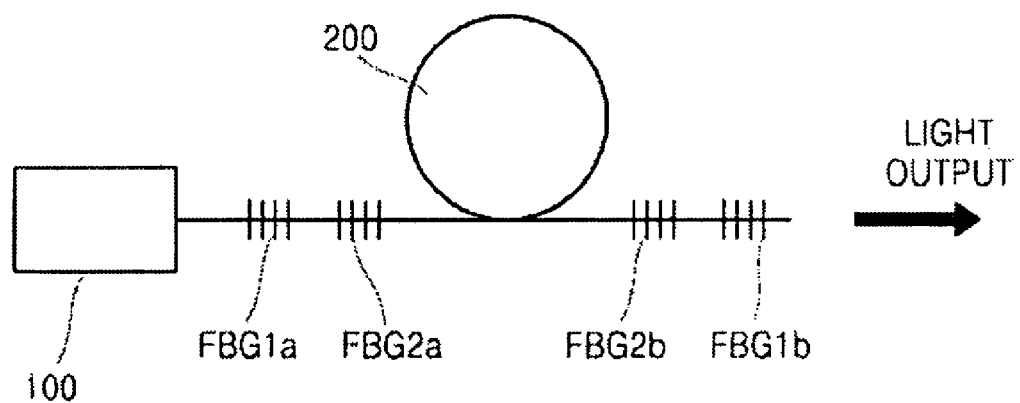
FIG. 3 illustrates a fiber laser system according to another embodiment of the present invention.

FIG. 3 illustrates a fiber laser system according to another embodiment of the present invention. In the following description, the same elements as in the embodiment of FIG. 1 will not be described for clarity and conciseness.

Referring to FIG. 3, the fiber laser system includes fiber containing dysprosium and formed in all-fiber type using a fiber Bragg grating (FBG). Generally, FBG reflects only a specific wavelength and transmits other wavelengths. Therefore, a pair of an FBG1*a* and an FBG1*b* for 3-μm lasing are disposed at both sides of fiber containing dysprosium. In detail, the FBG1*a* is disposed at one side of the fiber adjacent to a pump light source 100, and the FBG1B is disposed at the other side (light output side) of the fiber.

For example, the FBG1*a* can have high reflectivity, and the FBG1*b* can have low reflectivity (e.g., 50% of the reflectivity of the FBG1*a*).

Furthermore, to increase lasing efficiency by lasing at 4.3 μm as described above, another pair of an FBG2*a* and an FBG2*b* having a center wavelength in about 4.3 μm can be disposed at both sides of the fiber containing dysprosium. Owing to the FBG2*a* and the FBG2*b*, 4.3-μm lasing can be possible, and thus ESA can be reduced as described above. In FIG. 3, the FBG2*a* and the FBG2*b* are disposed close to a gain medium 200 as compared with the FBG1*a* and the FBG1*b*. This arrangement is an example. That is, the present invention is not limited to the arrangement illustrated in the FBG1*a*, FBG1*b*, FBG2*a*, and FBG2*b*. For example, the FBG1*a* and the FBG1*b* can be disposed close to the gain medium 200 as compared with the FBG2*a* and the FBG2*b*. In another embodiment, the arrangement order of the FBG1*a* and the FBG2*a* or the arrangement order of the FBG2*b* and FBG1*b* can be changed.

In general, the reflection band of FBG is very narrow, for example about 0.3 nm. Therefore, when a laser resonator is configured using a pair of FBGs as shown in FIG. 3, it may be difficult to align the center wavelengths of the respective FBGs, and the center wavelengths of FBGs can vary in the case of high-power lasing. Therefore, one of the FBGs can have a relatively large bandwidth as compared with that of the other for easily realizing a fiber laser system.

For example, in the embodiment shown in FIG. 3, the FBG1*a* and the FBG2*a* adjacent to the pump light source 100 can have a bandwidth larger than that of the FBG1*b* and the FBG2*b* for easily realizing the fiber laser system. When a laser resonator is formed using a FBG having a relatively large bandwidth and a FBG having a relatively small bandwidth as described above, the wavelength of lasing light can vary. For example, when the center wavelength of the FBG1*b* varies, the wavelength of lasing light can vary within the reflection wavelength range of the FBG1*a*.

Figure 4:
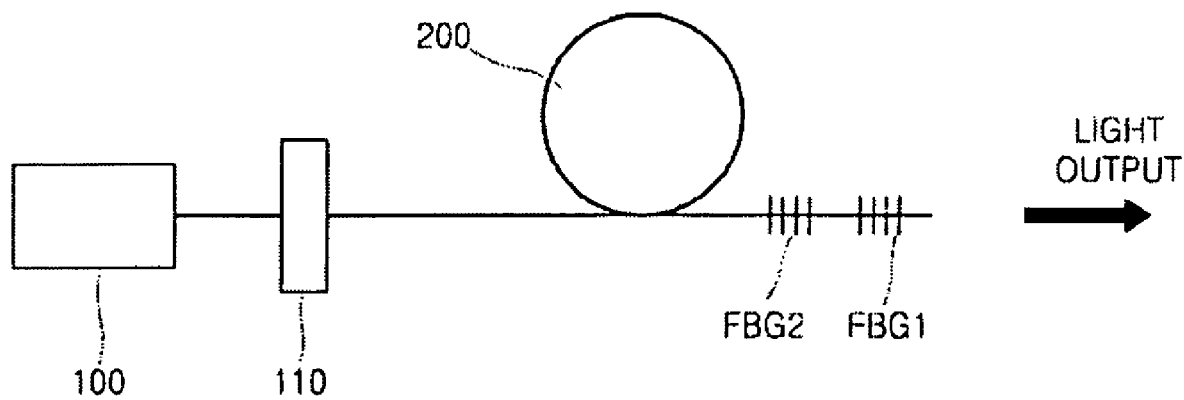
FIG. 4 illustrates a fiber laser system according to another embodiment of the present invention.

FIG. 4 illustrates a fiber laser system according to another embodiment of the present invention.

Referring to FIG. 4, a mirror such as a dichroic mirror 110 is disposed between a pump light source 100 and a gain medium 200, which transmits pump light having a pumping wavelength and reflects lasing light having a wavelength of, for example, about 3 μm and about 4.3 μm. An FBG is disposed at a light output side opposite to the dichroic mirror 110. One or more FBGs can be disposed at the light output side. For example, an FBG1 and an FBG2 can be disposed as shown in FIG. 4. In this case, as described above, one of the FBG1 and the FBG2 can have a center wavelength of about 3 μm, and the other can have a wavelength of about 4.3 μm.

When the fiber laser system of FIG. 4 is compared with the fiber laser system of FIG. 3, the fiber laser system of FIG. 4 can be constructed more easily. Since the dichroic mirror 110 has a large bandwidth, the wavelength of lasing light can be varied more widely by changing the center wavelength of the FBG1 disposed at the light output side.

Figure 5:
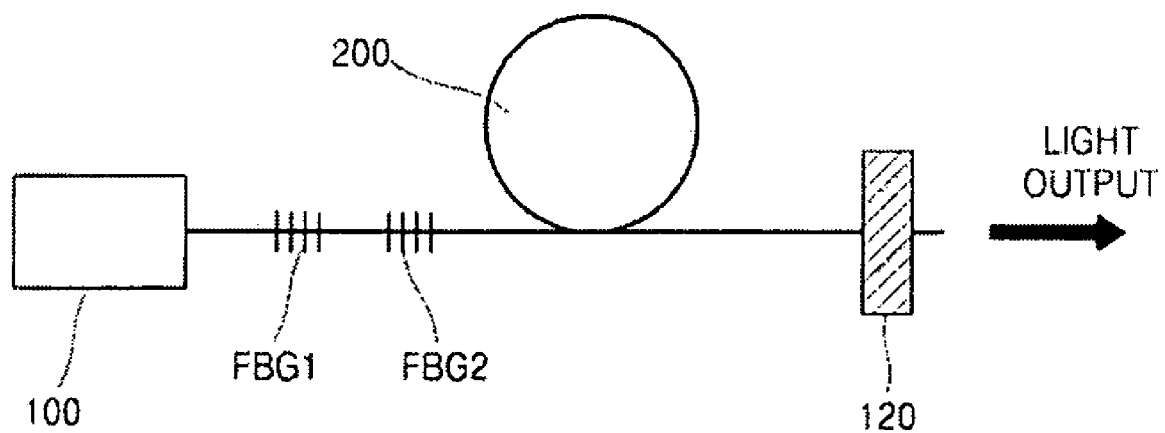
FIG. 5 illustrates a fiber laser system according to another embodiment of the present invention.

FIG. 5 illustrates a fiber laser system according to another embodiment of the present invention.

Referring to FIG. 5, an FBG1 having a center wavelength of about 3 μm is disposed adjacent to a pump light source 100, and a partial reflection mirror 120 is disposed at a light output side. Furthermore, a FBG2 having a center wavelength of about 4.3 μm can be disposed adjacent to the pump light source 100 as described above. Since the partial reflection mirror 120, the FBG1, and the FBG2 have the same functions as those of corresponding elements described above, detailed descriptions thereof will be omitted.

The pump light source 100 that is commonly used in the above-described embodiments will now be described in more detail.

A fiber laser system including fiber containing thulium (Tm) can be used for the pump light source 100 for light pumping. The fiber laser system including fiber containing thulium (Tm) has a lasing wavelength in the range from about 1.75 μm to about 2.1 μm. That is, the lasing wavelength range of the fiber laser system includes a wavelength of about 1.75 μm at which light absorption occurs for transition of electrons from the energy level $^6H_{15/2}$ to the energy level $^6H_{11/2}$. Therefore, as described above, the pump light source 100 can provide efficient light pumping.

In addition, a 1.5-μm, high-power Raman fiber laser system using erbium (Er) can be used for the pump light source 100. In this case, the pump light source 100 can provide pump light having a wavelength in the range from about 1.6 μm to about 2 μm. Therefore, the fiber laser system of the present invention that can emit lasing light having a wavelength of about 3 μm by using the pump light source 100 provides pump light having a wavelength in the range from about 1.6 μm to about 2 μm.

According to the present invention, the fiber laser system including fiber containing dysprosium uses light having a wavelength of about 1.7 μm as pump light. Furthermore, the resonator of the fiber laser system is configured with the dichroic mirror, the partial reflection mirror, and/or the FBG. Therefore, the fiber laser system can provide laser light having a wavelength of about 3 μm and have high light pumping efficiency and high output power. In addition, the lasing wavelength of the fiber laser system can be controlled by adjusting or modifying the elements of the resonator.

Furthermore, since the fiber laser system of the present invention uses pump light having a wavelength longer than that of pump light used for a conventional fiber laser system, the fiber laser system can have good pumping efficiency. Therefore, the uppermost energy level by ESA is low as compared with the case of a conventional fiber laser system, and thus light loss caused by an UV absorption edge of host glass can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A fiber laser system comprising:
   fiber including dysprosium (Dy);
   a pump light source disposed at a side of the fiber and emitting pump light having a wavelength exciting electrons of the dysprosium (Dy) from a ground energy level $^6H_{15/2}$ to an energy level $^6H_{11/2}$;
   a first reflection member, disposed between the fiber and the pump light source, transmitting the pump light, and reflecting first lasing light having a first wavelength; and
   a second reflection member, disposed at a side opposite to the pump light source with respect to the fiber, and transmitting a portion of the first lasing light.

2. The fiber laser system of claim 1, wherein the first wavelength ranges from 2.7 μm to 3.2 μm.

3. The fiber laser system of claim 1, wherein the first reflection member is a dichroic mirror.

4. The fiber laser system of claim 1, wherein the first reflection member is a first fiber Bragg grating (FBG).

5. The fiber laser system of claim 1, wherein the second reflection member is a partial reflection mirror.

6. The fiber laser system of claim 1, wherein the second reflection member is a second FBG.

7. The fiber laser system of claim 6, wherein the first wavelength varies according to the change of a center wavelength of the second FBG.

8. The fiber laser system of claim 1, wherein the first reflection member is a first FBG, and the second reflection member is a second FBG.

9. The fiber laser system of claim 8, wherein the first FBG has a reflection wavelength band wider than that of the second FBG.

10. The fiber laser system of claim 8, wherein the first wavelength varies according to the change of a center wavelength of the second FBG.

11. The fiber laser system of claim 1, wherein the pump light source emits laser light having a wavelength in a range from 1.5 μm to 1.9 μm.

12. The fiber laser system of claim 1, wherein the fiber comprises host glass formed of fluoride-based glass, sulfide-based glass, or selenide-based glass.

13. A fiber laser system comprising:
    fiber including dysprosium (Dy);
    a pump light source disposed at a side of the fiber and emitting pump light having a wavelength exciting electrons of the dysprosium (Dy) from a ground energy level $^6H_{15/2}$ to an energy level $^6H_{11/2}$;
    a first reflection member, disposed between the fiber and the pump light source, transmitting the pump light and reflecting first lasing light having a first wavelength;
    a second reflection member, disposed at a side opposite to the pump light source with respect to the fiber, and transmitting a portion of the first lasing light;
    a third reflection member, disposed between the fiber and the pump light source, and emission of second lasing light having a second wavelength; and
    a fourth reflection member, disposed at the side opposite to the pump light source with respect to the fiber, and the emission of the second lasing light.

14. The fiber laser system of claim 13, wherein the first wavelength ranges from 2.7 μm to 3.2 μm.

15. The fiber laser system of claim 13, wherein the second wavelength ranges from 4.1 μm to 4.5 μm.

16. The fiber laser system of claim 13, wherein the first through fourth reflection members are first through fourth FBGs, respectively.

17. The fiber laser system of claim 16, wherein the first FBG has a reflection wavelength band wider than that of the second FBG.

18. The fiber laser system of claim 16, wherein the first wavelength varies according to the change of a center wavelength of the second FBG.

19. The fiber laser system of claim 13, wherein the first and third reflection members are dichroic mirrors, and the second and fourth reflection members are second and fourth FBGs.

20. The fiber laser system of claim 19, wherein the first wavelength varies according to the change of a center wavelength of the second FBG.

21. The fiber laser system of claim 13, wherein the pump light source emits laser light having a wavelength in a range from 1.5 μm to 1.9 μm.

22. The fiber laser system of claim 13, wherein the fiber comprises host glass formed of fluoride-based glass, sulfide-based glass, or selenide-based glass.

* * * * *